March 4, 1924.  
W. A. GIBBS  
ANIMAL TRAP  
Filed March 21, 1921
1,485,976
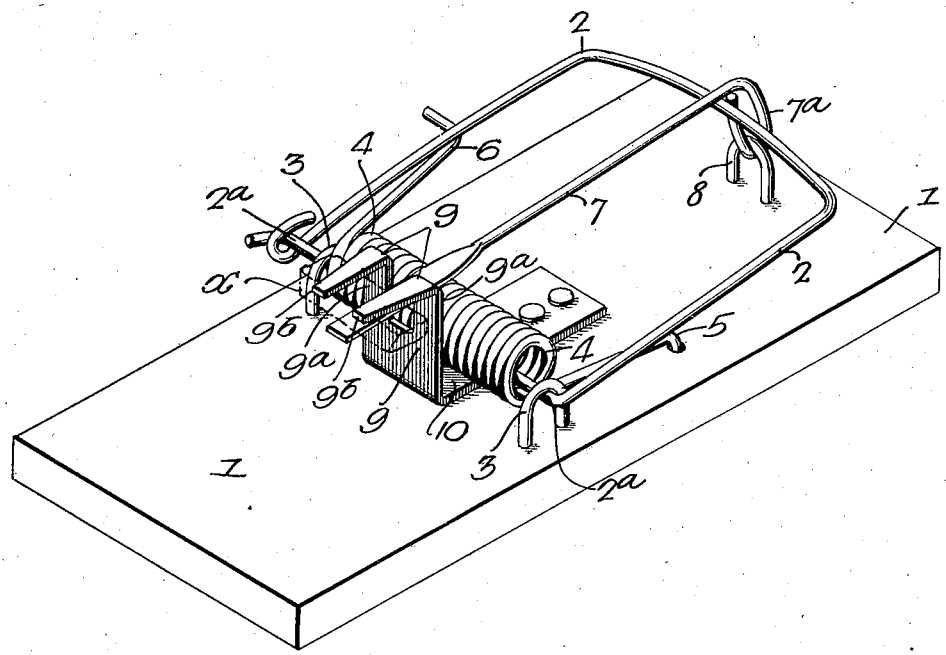
Inventor —
Walter A. Gibbs.
by his Attorneys —
Howson & Howson Patented Mar. 4, 1924.

1,485,976

UNITED STATES PATENT OFFICE.

WALTER A. GIBBS, OF WILMINGTON, DELAWARE.

ANIMAL TRAP.

Application filed March 21, 1921. Serial No. 454,042.

*To all whom it may concern:*

Be it known that I, WALTER A. GIBBS, a citizen of the United States, residing in Wilmington, New Castle County, Delaware, have invented certain Improvements in Animal Traps, of which the following is a specification.

This invention relates to improvements in animal traps, the object of the invention being to provide a trap from which, after it is set, removal of the bait is impossible without springing the trap.

The invention will be more readily understood by reference to the attached drawing, in which the figure is a view in perspective of a trap made in accordance with my invention and illustrating the set position thereof.

The trap employed for the purposes of illustrating the invention is a well known type of mouse trap, comprising a suitable base 1, upon which is pivotally mounted a movable jaw 2, said jaw, in the present instance, being formed from a single piece of wire bent to a substantially rectangular shape and secured to the said base by means, in the present instance, of staples 3, 3. The said jaw 2 is actuated by means of a coiled spring 4 mounted upon the pivotal arm $2^a$ of the jaw, said spring having one end 5 thereof attached by suitable means to the base 1, and having the other end 6 underlying or bearing against one side arm of the said jaw 2. A keeper or latch is provided in the form of a bar 7, which is pivotally attached at one end $7^a$ to the base 1, in the present instance by means of a staple 8 driven into the said base, which staple passes through an eye formed on the rod 7 at the said end $7^a$, said rod being adapted to pass over the outer end of the jaw 2 and to have its free end releasably retained in a manner hereinafter described between the forks 9, 9, of a member 10 suitably fixed to the base 1.

As shown in this figure, the forward end of the rod 7 extends between the upright portions $9^a$, $9^a$, of the fork 9, and a piece of bait $x$ shown in broken lines is inserted between the end of the said rod 7 which, in the present instance, is flattened out to form a more or less extended bearing surface, and the under sides of the substantially horizontal portions $9^b$, $9^b$, of the said fork 9, the said rod 7 being thus retained against the tension of the spring 4 acting through the jaw 2 in the position indicated. The trap is thus retained in the open or set position, it being apparent that the jaw 2 is held open against the pressure of the spring 4 entirely by reason of the bait $x$ which is inserted between the rod and the portions $9^b$, $9^b$, of the member 9 in the manner described.

It will be apparent that removal of the bait from the trap is impossible without release of the jaw 2 and the springing of the trap.

It will be understood that although I have illustrated and described my invention in connection with but one form of trap, the principle involved is applicable to traps of all types employed for any purpose.

I claim:

1. In an animal trap, the combination with a spring-actuated animal-engaging element, of a movable member adapted to engage and retain the said element against actuation by the spring, and a relatively fixed element constituting an abutment for a body interposed between the said fixed element and the retaining member, which body prevents movement of the retaining member to release the animal-engaging element.

2. In an animal trap, the combination with a spring-actuated animal-engaging element, of a movable member adapted to engage and retain the said element against actuation by the spring, a relatively fixed element constituting an abutment for a body interposed between said fixed element and the retaining member to prevent movement of said member to release the animal-engaging element, and extended surfaces upon the said relatively fixed element and the retaining member adapted to bear against said body.

3. In an animal trap, the combination with a spring-actuated animal-engaging element, of a movable member adapted to engage and retain the said element against actuation by the spring, and a relatively fixed element having therein a slot for the reception of the retaining member and comprising portions extending substantially parallel to the said retaining member when the latter occupies the said slot, said portions constituting abutments between which and the retaining member a body is adapted to be inserted to hold the said member in element-retaining position.

4. In an animal trap, the combination with a spring-actuated animal-engaging element, of a movable member adapted to engage and retain the said element against actuation by the spring, and a relatively fixed element having a slot into which the end of said retaining member is adapted to pass and comprising a pair of bait-retaining elements adapted to support between themselves and the end of the retaining member a bait element whereby the retaining member is held in position retaining the animal-engaging element.

5. In an animal trap, the combination with a spring-actuated animal-engaging element, of a movable member adapted to engage and retain the animal-engaging element against actuation by said spring, said retaining member having an extended surface against which a bait element is adapted to rest, and a relatively fixed element having a slot adapted to be occupied by said retaining member and comprising a pair of elements having extended surfaces adapted to overlie said bait element whereby the latter is retained between the respective extended surfaces of the retaining member and the relatively fixed member, thereby to hold the retaining member in the element-retaining position.

6. In an animal trap, the combination with a spring-actuated animal-engaging member, of a movable element adapted to engage and retain the said animal-engaging member against actuation by the spring, a relatively fixed element constituting an abutment for a body positioned in the path of the said retaining element and barring its movement to release the animal-engaging member, and a fork on one of said elements providing for a multi-point contact between said elements and the interposed body.

WALTER A. GIBBS.